April 4, 1950          A. WARMISHAM          2,502,543
HIGHLY CORRECTED OPTICAL OBJECTIVE WITH AXIALLY
SPACED SPHERICAL ABERRATION CORRECTION MEANS
Filed Dec. 12, 1947
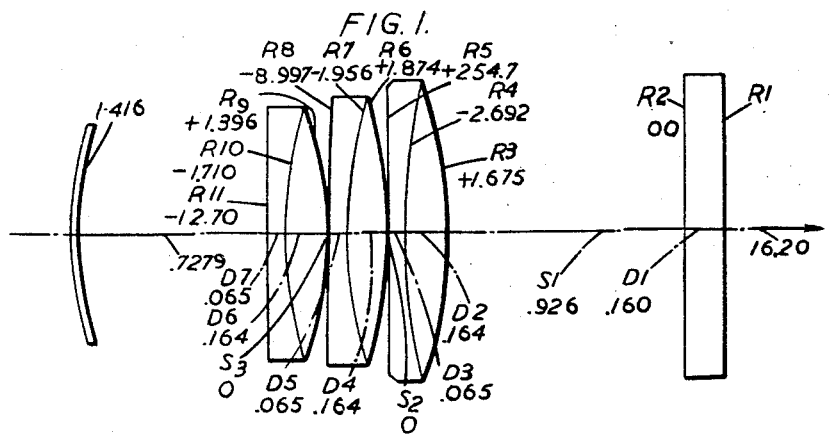
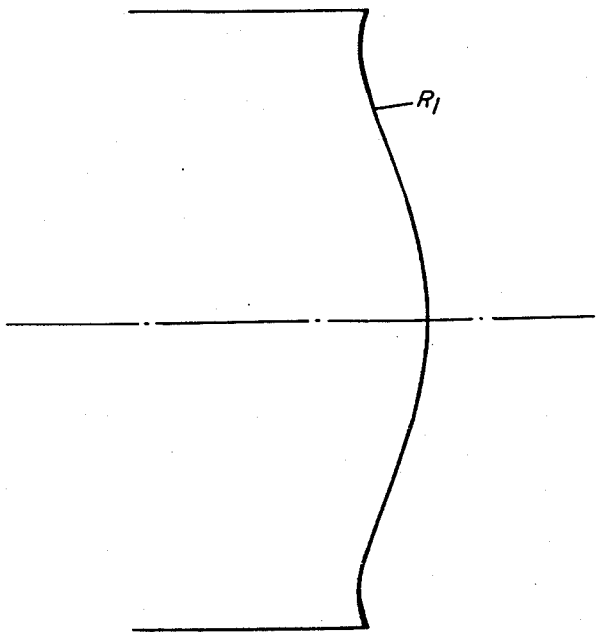
Inventor
Arthur Warmisham
By Emery, Holcombe & Blair
Attorney Patented Apr. 4, 1950

2,502,543

SEARCH ROOM

UNITED STATES PATENT OFFICE 2,502,543

HIGHLY CORRECTED OPTICAL OBJECTIVE WITH AXIALLY SPACED SPHERICAL ABERRATION CORRECTION MEANS

Arthur Warmisham, Leicester, England, assignor to Taylor, Taylor & Hobson Limited, Leicester, England, a company of Great Britain Application December 12, 1947, Serial No. 791,407
In Great Britain December 30, 1946

12 Claims. (Cl. 88—57)

This invention relates to optical objectives having a curved short-conjugate field for projection or other purposes. One important use for such an objective is for the optical projection on to a screen of the images formed by electrical scanning on suitable targets in cathode ray tubes, as used for television reception. Such images may be formed on curved targets and may, by suitable electrical means, be given any reasonable degree of distortion. This makes it possible to utilise such electrical means in conjunction with the shape of the target to contribute towards the correction of field curvature and distortion in the resultant image projected on to the screen, thereby simplifying the design of the objective itself.

The invention of the copending patent application of the United States of America Serial No. 673,304, filed on May 31, 1946, now U. S. Patent No. 2,479,907, dated August 23, 1949, has for its object to provide an objective well-corrected for spherical and chromatic aberrations, coma and astigmatism for a relatively high aperture of, say F/1.4, and covering a reasonable angular field of, say, 32 degrees, the objective according to such invention comprising two members separated by an air space lying between .40 and 1.20 times the equivalent focal length of the rear member, the rear member consisting of a pair of achromatic doublets separated by an air space lying between 0 and .10 times such focal length, whilst the front member consists of a simple element having one surface slightly aspherical.

It should be made clear that the terms "front" and "rear" are herein used, in accordance with the usual convention, to relate to the sides of the objective respectively nearer to and further from the longer conjugate, so that when used for projection the light passes through the objective from the rear to the front.

The present invention has for its object to effect improvements in the objective of such copending application to give a higher numerical aperture.

To this end, according to the present invention, the objective is corrected for spherical and chromatic aberrations, coma and astigmatism, and comprises two members separated by an air space lying between 0.6 and 1.2 times the equivalent focal length of the rear member, the rear member consisting of three convergent achromatic doublets and having an overall axial length between .50 and .85 times such equivalent focal length, whilst the front member consists of a simple element having one surface slightly aspherical, the asphericity should be such that at no point does the departure from the true sphere exceed .025 times the equivalent focal length of the rear member.

The objective may be so arranged as to project an image of the object (for example the target of a cathode ray tube) on to a substantially flat field with little residual distortion, and to facilitate this the object may be in the form of a spherically curved surface concave towards the objective with a radius of curvature lying between 1.0 and 2.0 times the equivalent focal length of the rear member, the objective being designed for use with such an object.

As in the objective of the copending application, the aspherical surface of the simple front member is constituted by a surface of revolution generated by the rotation about the y-axis, that is the optical axis of the objective, of a curve of the form $$y = ax^2 + bx^4 + cx^6 + \ldots$$

+ higher even powers of $x$, wherein the coefficients $a, b, c \ldots$ are constants and determine the degree of departure of the surface from true spherical form, the term "spherical" being used to include a sphere of infinite radius, that is a plane surface. It will, in fact, often be convenient in practice for the aspherical surface to consist of a figured plane surface, the figuring (that is, the departure of the surface from the true plane) being small at all radial distances from the axis.

It is not essential for the cooperating internal contact surfaces in each of the three doublets of the rear member to be cemented together or to have exactly the same radius of curvature, but such surfaces (whether cemented or not) are preferably concave to the front in each doublet. The most deeply curved of such internal contact surfaces preferably has a radius of curvature between 1.4 and 2.1 times the equivalent focal length of the rear member, the effective radius of curvature of an internal contact in the case when its cooperating surfaces have slightly different radii of curvature being taken as the harmonic mean between the two radii. Conveniently, each doublet consists of a biconvex convergent element in front of a meniscus divergent element made of a material having greater mean refractive index and lower Abbé V number than that of the associated convergent element. The Abbé V number of the material used for the convergent element preferably exceeds 1.8 times that of the associated divergent element and is preferably not less than 50.0.

The material of the simple front member preferably has an Abbé V number not less than 50.0.

A preferred practical example of objective according to the invention is illustrated in the accompanying drawings, in which Figure 1 shows the objective with the target object indicated in position on the left-hand side, the projection screen being far beyond the right-hand edge of the paper, and Figure 2 is an enlarged view of the aspherical front surface of the objective with the horizontal scale of the drawing greatly exaggerated to give an indication of the shape of the surface, such scale being roughly twenty times the vertical scale of the drawing.

Numerical data for the example illustrated are given in the following table, in which $R_1$, $R_2$ ... represent the radii of curvature of the individual surfaces counting from the front, the positive sign indicating that the surface is convex to the front and the negative sign that it is concave thereto, $D_1$, $D_2$ ... represent the axial thicknesses of the individual elements, and $S_1$, $S_2$, $S_3$ represent the axial air separations between the components. The table also gives the mean refractive indices $n_D$ for the D-line and the Abbé V numbers of the materials used for the various elements. The shape of the aspherical surface is defined by tabulating the coordinates of the meridian curve of the surface, the x-coordinate representing the radial distance from the optical axis and the y-coordinate the distance in the direction of the optical axis from the transaxial plane through the vertex of the surface towards the rear of such plane.

| Radius | Thickness or Air Separation | Refractive Index $n_D$ | Abbé V number |
|---|---|---|---|
| $R_1$ Aspherical surface | | | |
| $R_2$ ∞ | $D_1$ .160 | 1.613 | 59.3 |
| $R_3$ +1.675 | $S_1$ .926 | | |
| $R_4$ −2.692 | $D_2$ .164 | 1.613 | 59.3 |
| $R_5$ +254.7 | $D_3$ .065 | 1.748 | 28.0 |
| $R_6$ +1.874 | $S_2$ 0 | | |
| $R_7$ −1.956 | $D_4$ .164 | 1.613 | 59.3 |
| $R_8$ −8.997 | $D_5$ .065 | 1.748 | 28.0 |
| $R_9$ +1.396 | $S_3$ 0 | | |
| $R_{10}$ −1.710 | $D_6$ .164 | 1.613 | 59.3 |
| $R_{11}$ −12.70 | $D_7$ .065 | 1.748 | 28.0 |

Coordinates of aspherical surface $R_1$:

| $x$ | $y$ | $x$ | $y$ |
|---|---|---|---|
| .033 | .00005 | .298 | .00358 |
| .066 | .00021 | .331 | .00417 |
| .099 | .00050 | .364 | .00464 |
| .132 | .00088 | .397 | .00500 |
| .166 | .00131 | .430 | .00520 |
| .199 | .00181 | .447 | .00522 |
| .232 | .00239 | .464 | .00517 |
| .265 | .00298 | .497 | .00484 |

This example is designed for use with a spherically curved object surface (the cathode ray tube target) having a radius of curvature 1.416 concave towards the objective, and gives a magnification X16.2, the axial distance of the image surface in front of the surface $R_1$ being 16.20 and that of the object surface from the surface $R_{11}$ being .7279. The numerical aperture of the objective is .5.

The aspherical surface $R_1$ is slightly convex towards the front at the axis, with radius of curvature 10.0, and reaches its maximum deviation from the tangent plane at the axial point at a radius of about .45, such maximum deviation being of the order of .005. The overall curvature of the aspherical surface may be varied, if desired, in a manner analogous to that described in the specification of the copending application Serial No. 673,304 above mentioned, to give substantially the same degree of correction for the objective working at slightly different conjugates and with slightly different separations between the front and rear members.

It will be noticed that in this example the convergent elements of the three doublets and the simple front member are all made of the same material, and so also are the divergent elements of the three doublets, the Abbé V number of the material used for the convergent elements being approximately 2.1 times that for the divergent elements.

It should be made clear that the dimensions in this example are given in terms of unit equivalent focal length of the rear member constituted by the three doublets.

Although this example has been described primarily with reference to its use for projecting on to a screen an image of a curved object surface, it will be appreciated that it can be used for other purposes. Thus it can readily be employed in the reverse sense for photographic purposes, means known in themselves being provided for shaping the photographic film or other surface to the spherical curve required at the short conjugate.

What I claim as my invention and desire to secure by Letters Patent is:

1. An optical objective corrected for spherical and chromatic aberrations, coma and astigmatism, and having a curved short-conjugate field, and comprising a rear member consisting of three convergent achromatic doublets and having an overall axial length between .50 and .85 times the equivalent focal length of the member, and a front member separated from the rear member by an axial air space between 0.6 and 1.2 times such equivalent focal length and consisting of a simple element having a focal length between ten and thirty times the equivalent focal length of the rear member and having one surface slightly aspherical, the departure of such surface from the true sphere at no point exceeding .025 times such equivalent focal length.

2. An optical objective as claimed in claim 1, in which the internal contact surfaces in the three doublets of the rear member are concave to the front, and the most deeply curved of such surfaces has a radius of curvature between 1.4 and 2.1 times the equivalent focal length of the rear member.

3. An optical objective as claimed in claim 2, in which each doublet consists of a convergent biconvex element in front of a meniscus divergent element made of a material having greater mean refractive index and lower Abbé V number than that of the associated convergent element, the Abbé V number of the material of the convergent element being not less than 50.0.

4. An optical objective as claimed in claim 1, in which each of the three doublets consists of a convergent biconvex element in front of a meniscus divergent element made of a material having greater mean refractive index than that of the associated convergent element, the Abbé V number of the material used for the convergent element exceeding 1.8 times that of the divergent element.

5. An optical objective as claimed in claim 1, in which the material of the simple front member has an Abbé V number not less than 50.0.

6. An optical objective as claimed in claim 1, in which each of the three doublets consists of a convergent biconvex element in front of a meniscus divergent element made of a material having greater mean refractive index than that of the associated convergent element, the Abbé V number of the material used for the convergent element exceeding 1.8 times that of the divergent element, and wherein the material of the simple front member has an Abbé V number not less than 50.0.

7. An optical objective corrected for spherical and chromatic aberrations, coma and astigmatism, and having little residual distortion, and comprising a rear member consisting of three convergent achromatic doublets and having an overall axial length between .50 and .85 times the equivalent focal length of the member, and a front member separated from the rear member by an axial air space between 0.6 and 1.2 times such equivalent focal length and consisting of a simple element having a focal length between ten and thirty times the equivalent focal length of the rear member and having one surface slightly aspherical, the departure of such surface from the true sphere at no point exceeding .025 times such equivalent focal length, the short-conjugate field of the objective being in the form of a spherically curved surface concave towards the objective with radius of curvature between 1.0 and 2.0 times such equivalent focal length, whilst the long-conjugate field is substantially flat.

8. An optical objective as claimed in claim 7, in which the internal contact surfaces in the three doublets of the rear member are concave to the front, and the most deeply curved of such surfaces has a radius of curvature between 1.4 and 2.1 times the equivalent focal length of the rear member.

9. An optical objective as claimed in claim 8, in which each of the three doublets consists of a convergent biconvex element in front of a meniscus divergent element made of a material having greater mean refractive index than that of the associated convergent element, the Abbé V number of the material used for the convergent element exceeding 1.8 times that of the divergent element.

10. An optical objective as claimed in claim 7, in which each of the three doublets consists of a convergent biconvex element in front of a meniscus divergent element made of a material having greater mean refractive index and lower Abbé V number than that of the associated convergent element, the Abbé V number of the material of the convergent element being not less than 50.0.

11. An optical objective as claimed in claim 7, in which the material of the simple front member has an Abbé V number not less than 50.0.

12. An optical objective as claimed in claim 7, in which each of the three doublets consists of a convergent biconvex element in front of a meniscus divergent element made of a material having greater mean refractive index and lower Abbé V number than that of the associated convergent element, the Abbé V number of the material of the convergent element being not less than 50.0, and wherein the material of the simple front member has an Abbé V number not less than 50.0.

ARTHUR WARMISHAM.

REFERENCES CITED

The following references are of record in the file of this patent:

UNITED STATES PATENTS

| Number | Name | Date |
|---|---|---|
| 934,579 | Straubel et al. | Sept. 21, 1909 |
| 1,347,673 | Bishop | July 27, 1920 |
| 1,968,222 | Ritcher | July 31, 1934 |
| 2,049,041 | Berggren | July 28, 1936 |
| 2,100,290 | Lee | Nov. 23, 1937 |
| 2,146,905 | McLeod et al. | Feb. 14, 1939 |
| 2,170,979 | Straubel | Aug. 29, 1939 |
| 2,176,482 | Altman | Oct. 17, 1939 |
| 2,265,992 | Beck | Dec. 16, 1941 |
| 2,394,635 | Reiss | Feb. 12, 1946 |
| 2,423,676 | Altman | July 8, 1947 |